UNITED STATES PATENT OFFICE.

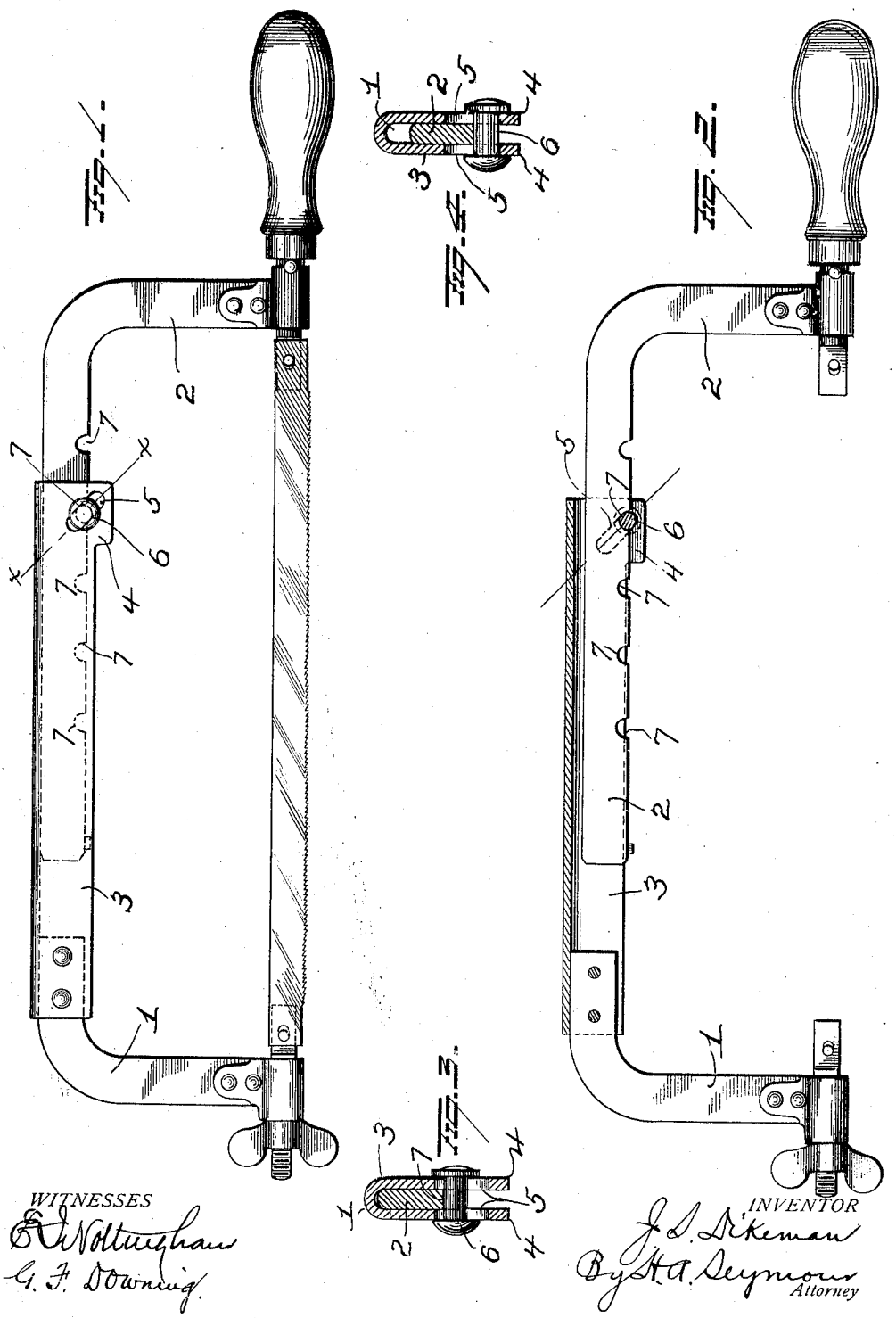

JOSEPH S. DIKEMAN, OF NORWALK, CONNECTICUT, ASSIGNOR TO THE DIKEMAN MANUFACTURING COMPANY, OF NORWALK, CONNECTICUT.

HACKSAW.

1,044,359.  Specification of Letters Patent.  Patented Nov. 12, 1912.

Application filed September 18, 1912.  Serial No. 721,038.

*To all whom it may concern:*

Be it known that I, JOSEPH S. DIKEMAN, a citizen of the United States, residing at Norwalk, in the county of Fairfield and State of Connecticut, have invented certain new and useful Improvements in Hacksaws; and I do hereby declare the following to be a full, clear, and exact description of the invention, such as will enable others skilled in the art to which it appertains to make and use the same.

My invention relates to an improvement in hack saws, and particularly those in which the frame is made of two parts and is extensible, and it consists in improved means in locking the two members of the frame together.

In the accompanying drawings, Figure 1 is a view in side elevation of my improved saw, showing the two parts in their normal or locked position. Fig. 2 is a view showing the floating rivet at the lower end of the slot. Fig. 3 is a view in section on the line x—x of Fig. 1 and Fig. 4 is a similar view in section through Fig. 2.

The saw frame is of the U-shape extensible type, and comprises the section 1 and the handle end or section 2, the former of which is provided with a flattened sleeve or coupling 3, riveted or otherwise rigidly secured to the same. This sleeve or coupling 3 is preferably open at the bottom, as shown, and is of a size sufficient internally to receive and permit of the free movement of the telescoping end of handle section 2 of the frame.

In saws of this type now in use, the sleeve or coupling 3, is provided with recesses or holes to receive a tooth or projection carried by section 2 at or near the free end of the latter, for locking the section against longitudinal movement, hence in order to lengthen or shorten the saw frame, it is necessary to disengage the tooth from the recess or hole in the coupling, and this can only be done by turning section 2 at an angle until the tooth is disengaged from its recess in the sleeve or coupling, and then moving the sections while in this angular position until the desired adjustment has been reached, and then by straightening out the sections, the tooth enters its notch in the sleeve or coupling and locks the two sections together. In the present instance I enlarge the free ends of the sleeve or coupling 3, as shown at 4, and provide the enlargements with the inclined slots 5 in which is loosely mounted the floating rivet 6. This rivet normally rests at the bottom of the slots, and when so located, the space between the rivet and the inner top surface of the sleeve or coupling is ample to permit of the free longitudinal movement of the section 2 of the frame without any angular movement of either section. Handle section 2 of the frame is provided on its underside with a series of curved notches 7 which form seats for the floating rivet 6. After the sections have been adjusted, the weight of section 2, causes it to drop onto the rivet, and by pushing endwise on section 2; the engagement of the rivet with the curved notch 7 in the lower edge of section 2, causes the rivet to ride up the inclined slot until stopped by the engagement of the upper edge of section 2 of the frame with the inner wall of the top of the sleeve or coupling, hence so long as there is any endwise pressure or pull on section 2, as there always is when a saw blade is secured to both sections 1 and 2, the two sections will be locked together against the possibility of separation. By releasing the tension on the saw blade, the weight of section 2 of the frame will cause the floating rivet 6 to drop and thus leave section 2 of the frame free to be slightly elevated and adjusted.

When the saw blade is tightened up, the floating rivet 6 slides up the inclined plane, until the section 2 of the frame has a bearing throughout its entire length against the top wall of the coupling, thus making the connection or lock between the two sections extra strong and rigid.

It is evident that many slight changes might be resorted to in the relative arrangement of parts shown and described without departing from the spirit and scope of my invention. Hence I would have it understood that I do not wish to confine myself to the exact arrangement of parts shown and described, but Having fully described my invention what I claim as new and desire to secure by Letters-Patent, is:—

1. A hack saw frame made in two sections one of which has a hollow coupling to receive an end of the other section and a floating rivet mounted in an elongated slot in said coupling and adapted to engage a notch in the other section.

2. A hack saw frame made in two sections one of which has a hollow coupling to receive an end of the other section, the said hollow coupling having an elongated inclined slot, and a rivet mounted in said elongated slot and adapted to engage a notch in one edge of the other section of the frame.

3. A hack saw frame made in two sections one of which has a hollow coupling to receive an end of the other section, the said coupling having elongated inclined slots in its side walls and a rivet mounted to move in said slot, the space between the rivet when the latter is at the bottom of the slots, and the top wall of the coupling being sufficient for the free movement of the other or handle end section of the frame, the said handle end of the frame having notches to engage the rivet.

In testimony whereof, I have signed this specification in the presence of two subscribing witneses.

JOSEPH S. DIKEMAN.

Witnesses:
JAMES PAUL.
A. DWIGHT KEEP.